Dec. 12, 1961            A. LEE            3,012,601
APPARATUS FOR MAKING PLASTIC COVERED COUNTER TOPS
Filed May 19, 1958            6 Sheets-Sheet 1
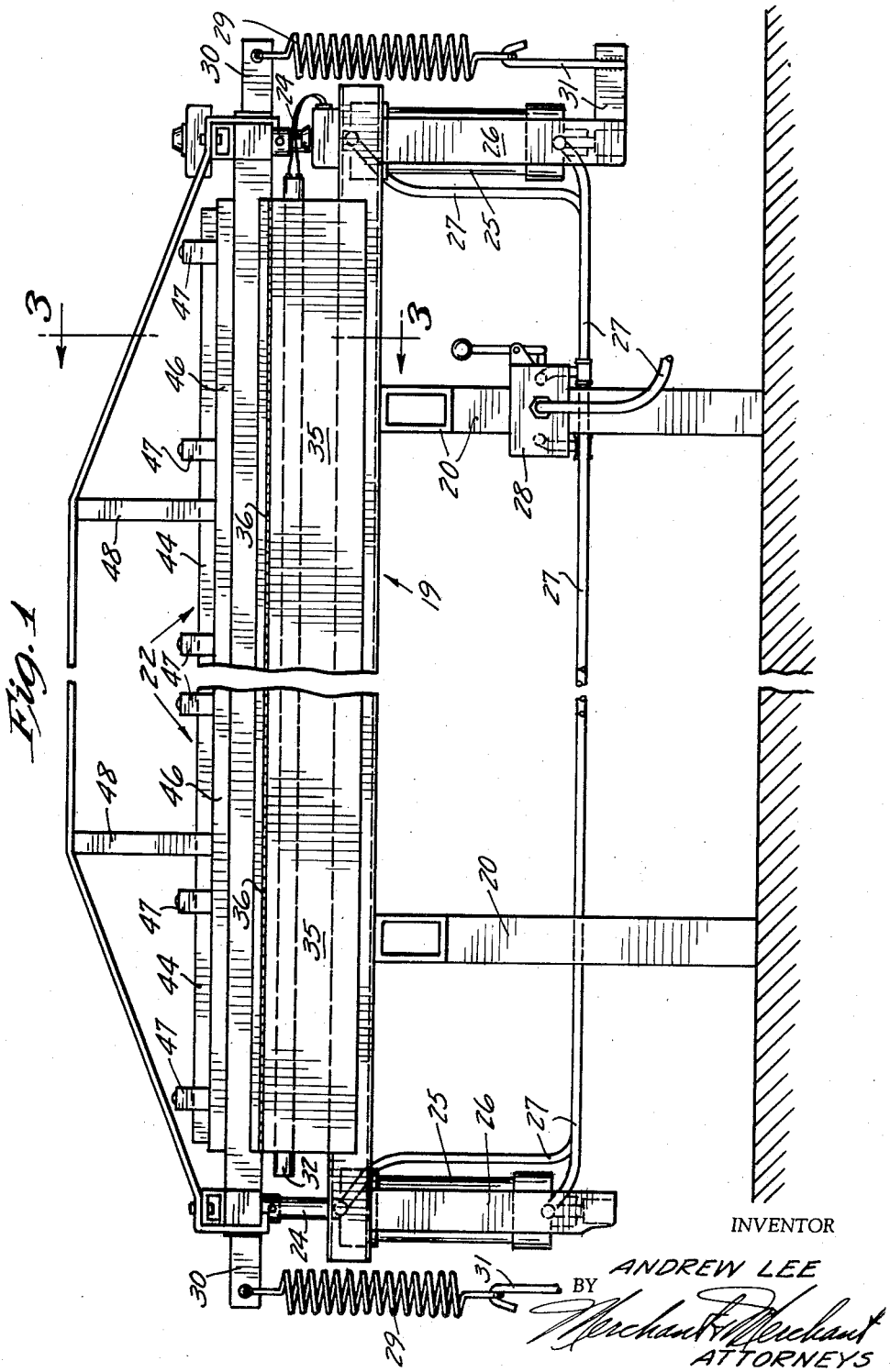
INVENTOR
ANDREW LEE
BY
Merchant & Merchant
ATTORNEYS

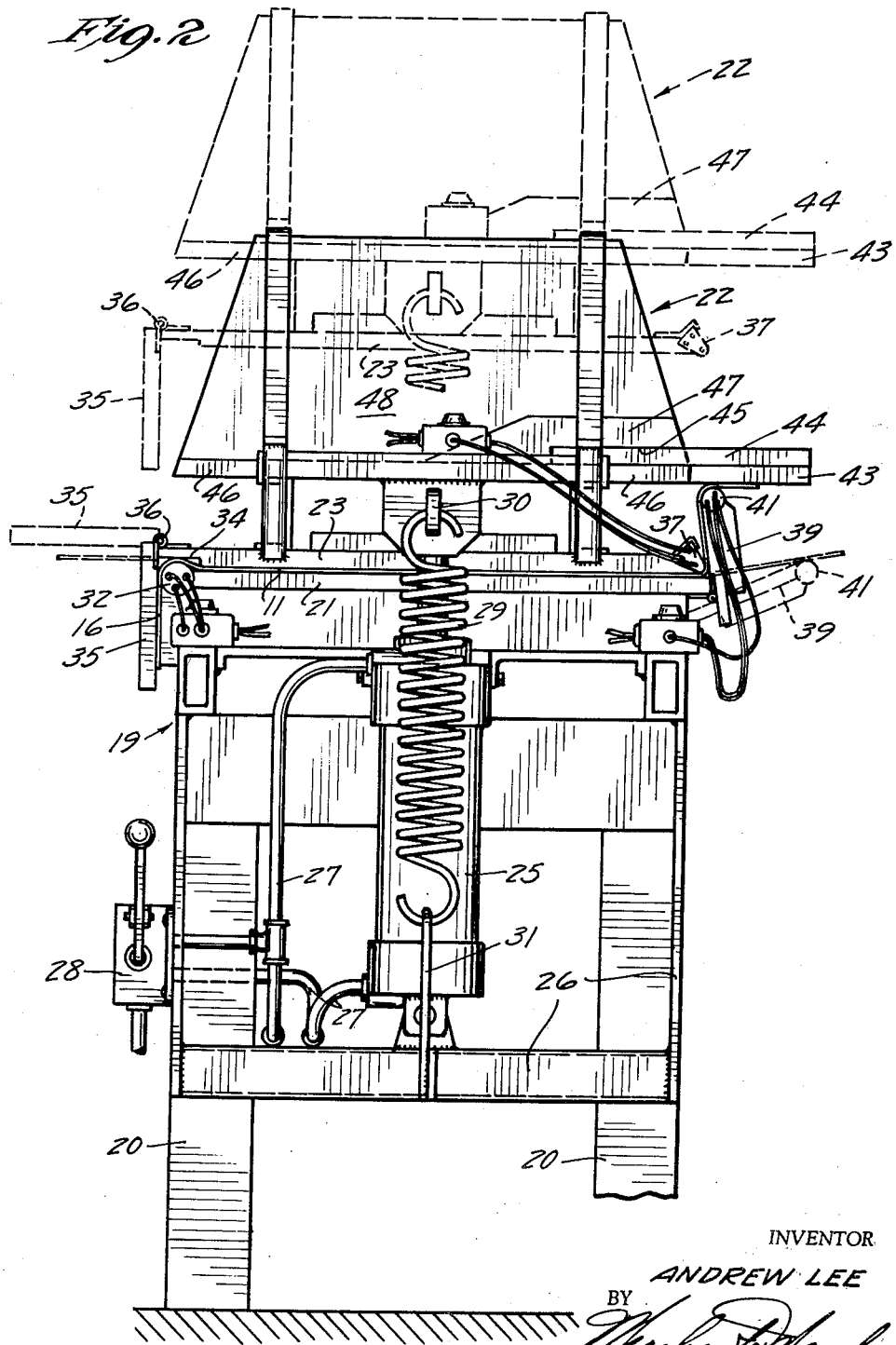

Dec. 12, 1961     A. LEE     3,012,601
APPARATUS FOR MAKING PLASTIC COVERED COUNTER TOPS
Filed May 19, 1958     6 Sheets-Sheet 3
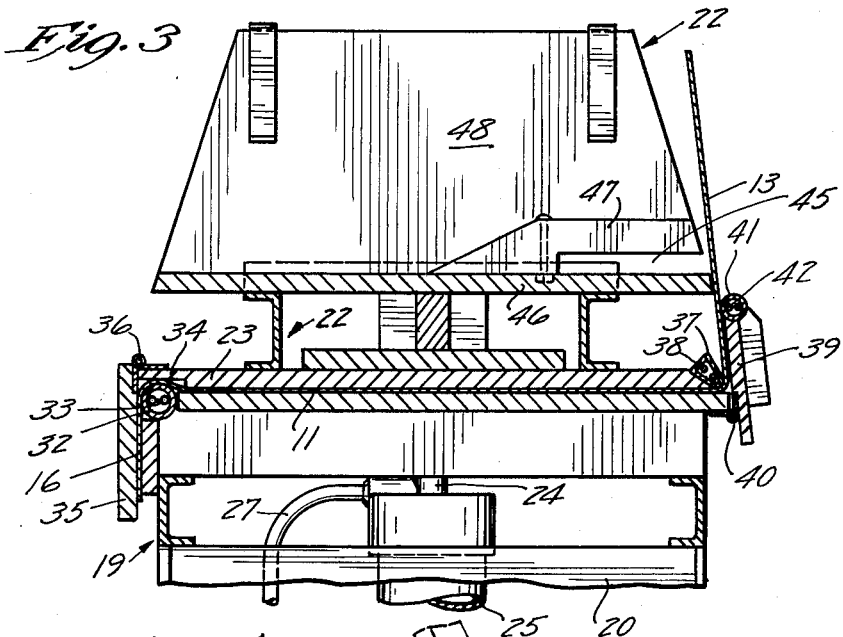
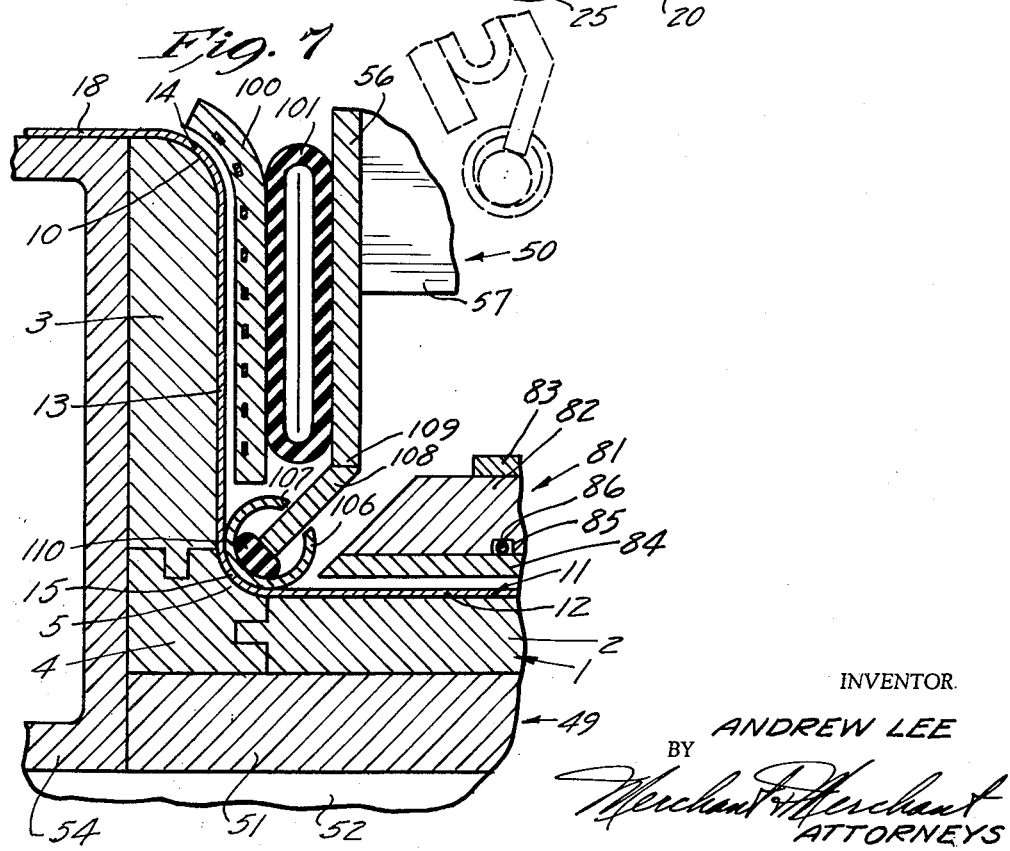
INVENTOR.
ANDREW LEE
BY
*Merchant & Merchant*
ATTORNEYS Dec. 12, 1961 A. LEE 3,012,601
APPARATUS FOR MAKING PLASTIC COVERED COUNTER TOPS
Filed May 19, 1958 6 Sheets-Sheet 4
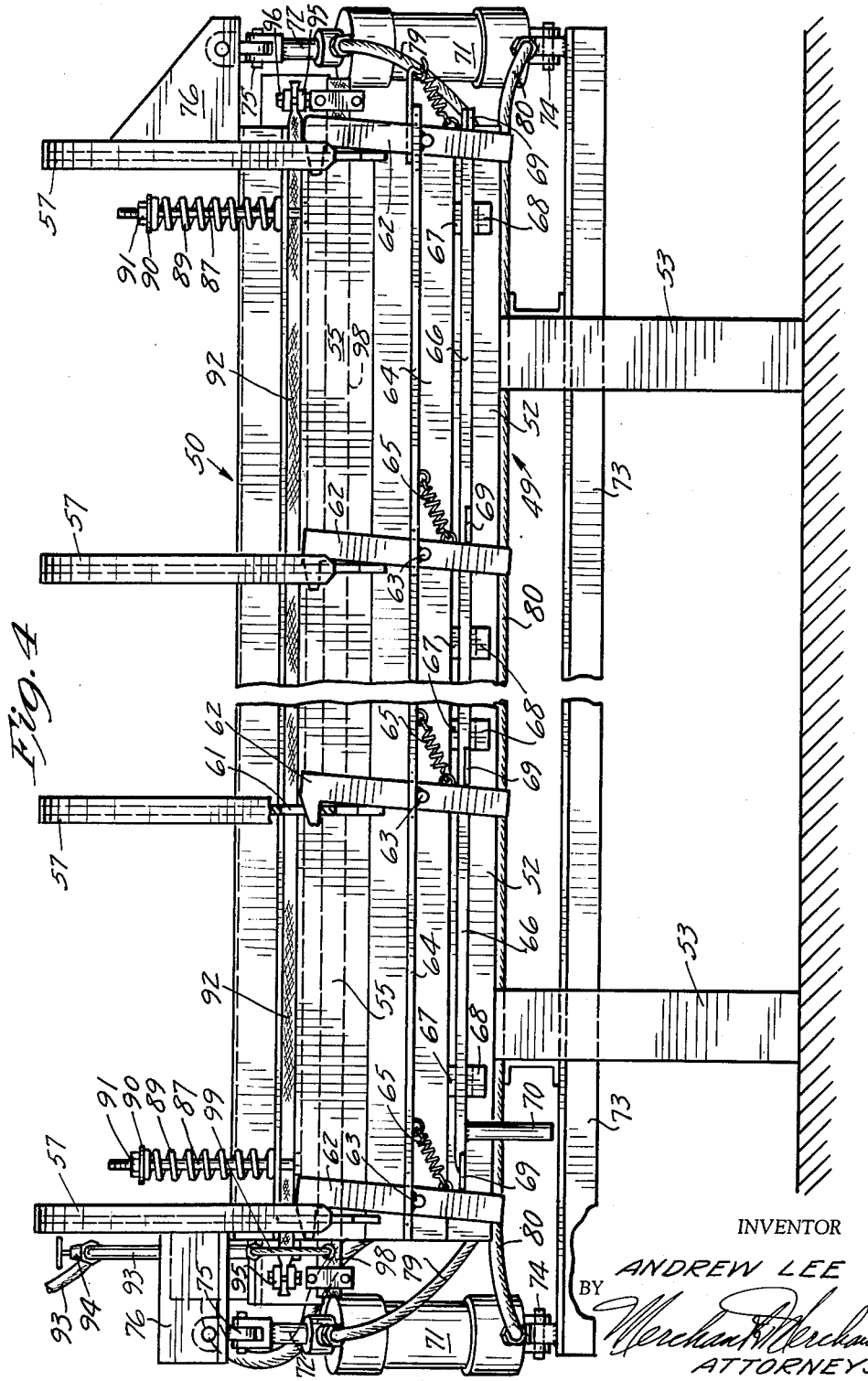
INVENTOR
ANDREW LEE
BY
Merchant & Merchant
ATTORNEYS

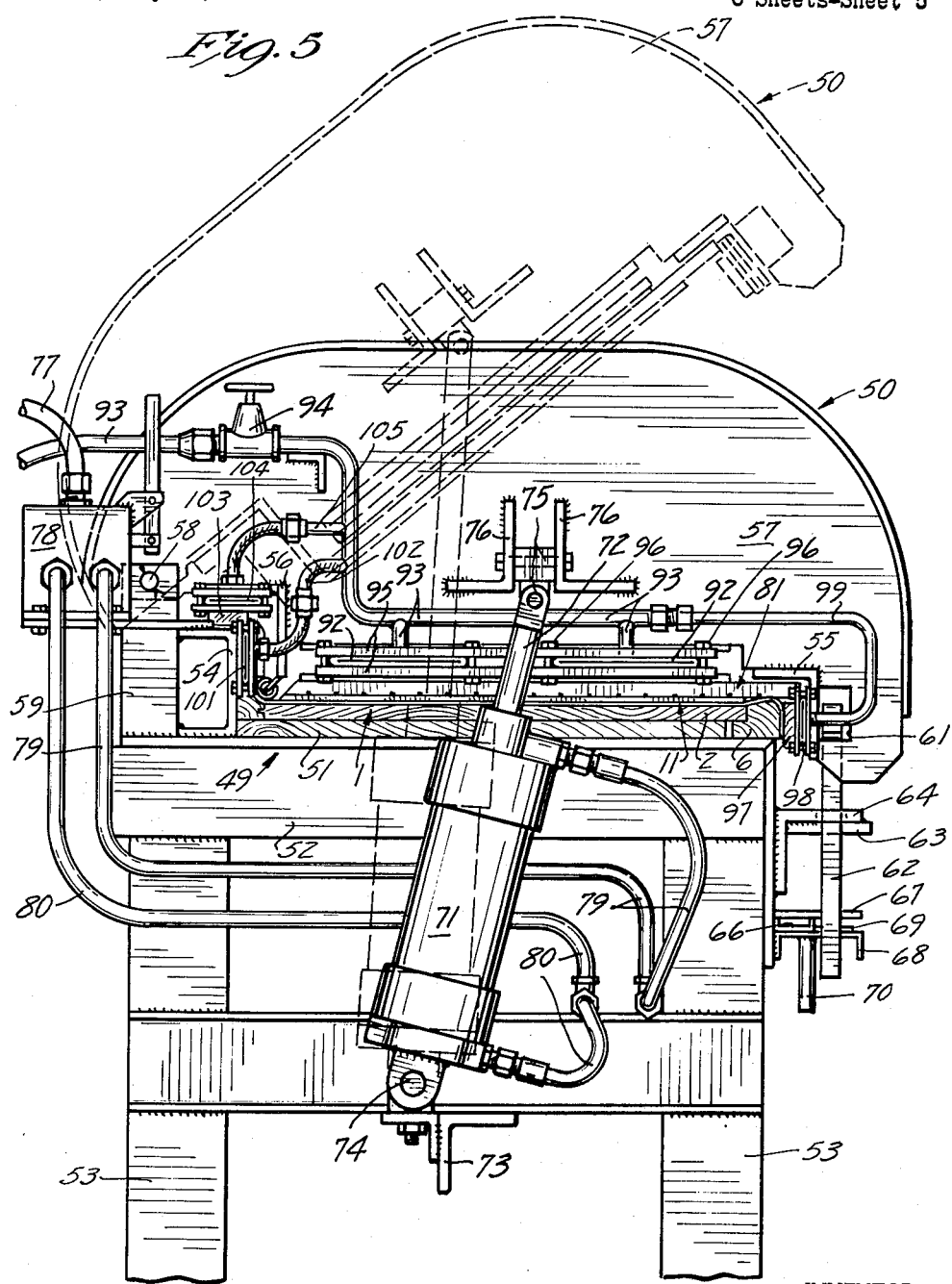

Dec. 12, 1961  A. LEE  3,012,601
APPARATUS FOR MAKING PLASTIC COVERED COUNTER TOPS
Filed May 19, 1958  6 Sheets-Sheet 6
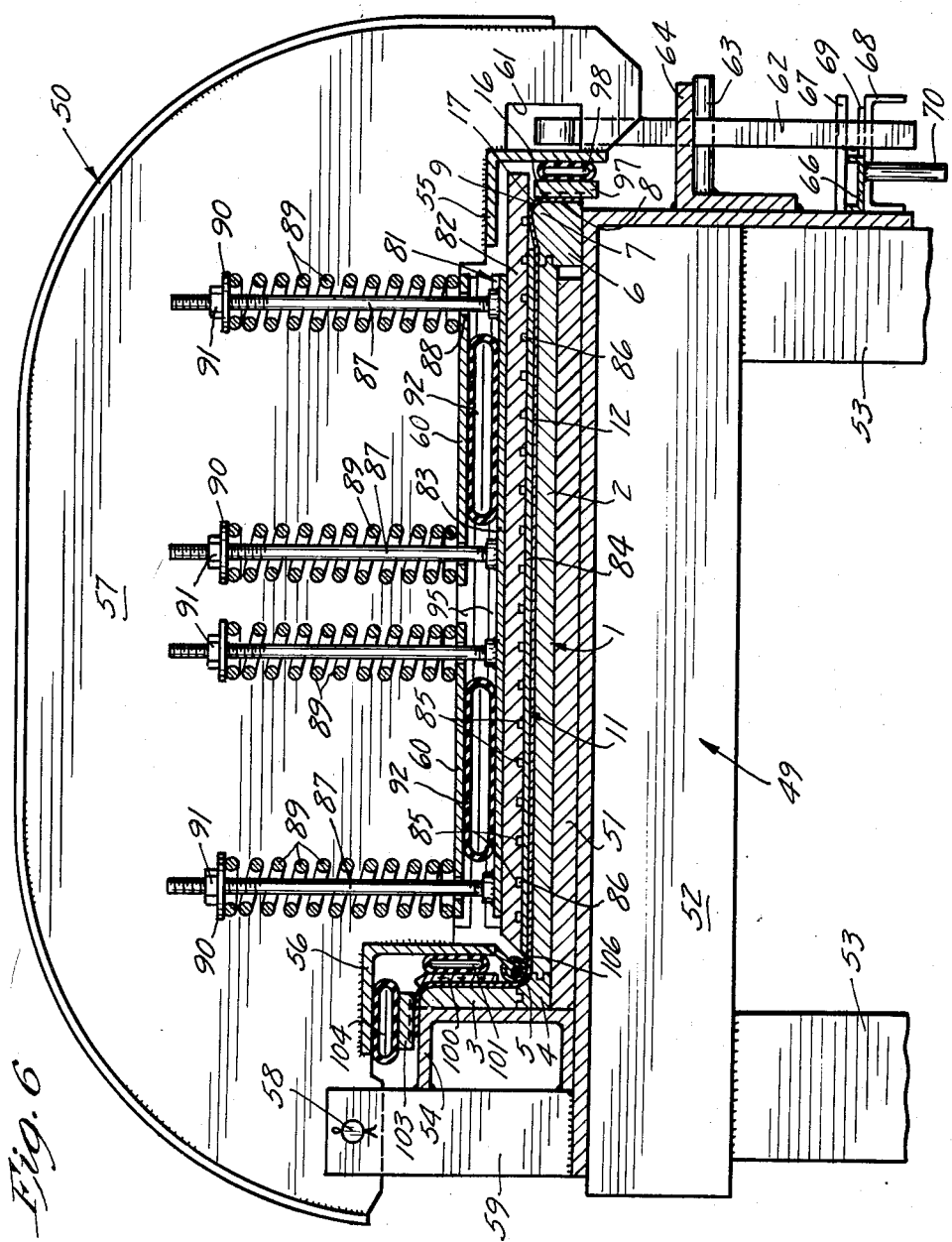
INVENTOR
ANDREW LEE
BY
Merchant & Merchant
ATTORNEYS

United States Patent Office 3,012,601
Patented Dec. 12, 1961

3,012,601
APPARATUS FOR MAKING PLASTIC
COVERED COUNTER TOPS
Andrew Lee, Minneapolis, Minn., assignor to Top-Fab Company, Minneapolis, Minn., a corporation of Minnesota
Filed May 19, 1958, Ser. No. 736,267
1 Claim. (Cl. 156—583)

My invention relates generally to the art of making counter tops and more particularly to a novel method and apparatus for making counter tops of the kind having, a flat horizontally disposed intermediate counter portion, a generally vertically disposed upwardly projecting back portion, and a downturned front edge portion, and comprising a supporting structure and a cover structure, said cover structure being formed from a sheet of synthetic plastic material of the type that is relatively rigid at normal room temperature and which is rendered pliable upon application of heat thereto.

Heretofore, in the manufacture of such counter tops, it has been the practice to, first build up the base structure of wood or similar material, and then apply a sheet of said plastic material to the base structure and, utilizing heat and pressure, bend said sheet to conform to the contours of the base structure, one or both thereof having a coating of cement applied thereto to cause a bond to be made between the base structure and plastic cover. Usually the synthetic plastic sheet is of the type manufactured under the trademark "Formica."

Another practice which has been followed in the making of counter tops is as follows: First, a sheet of the synthetic plastic cover material is cemented in flat form to an elongated generally rectangular sheet of plywood or the like. The plywood sheet is then longitudinally cut in relatively closely spaced parallel relation to one longitudinal edge thereof, by sawing, routing or the like, to divide the plywood sheet into relatively wide and relatively narrow bottom and back forming panels respectively. Thereafter, by applying heat to that portion of the plastic sheet material between the panels, the back forming panel and portion of the plastic sheet adhered thereto are bent upwardly to provide a generally vertically disposed back portion of the counter top. The corner portion between the horizontally and vertically disposed portions is usually arcuate, the radius of the arc being substantially three-quarters of an inch. In many instances, this type of counter top is installed with no backing whatsoever for the corner portion, and the same is often broken through by kitchen utensils or the like carelessly thrust thereagainst.

An important object of my invention is the provision of a novel method of making counter tops of the type set forth which results in a strong and durable structure not easily subject to damage in use.

Another object of my invention is the provision of a novel method of making counter tops of the type set forth which enables the counter top to be produced at a minimum of cost and with a maximum savings in production time.

In accomplishing the above ends, my novel method comprises, building a base structure of a given size and having predetermined contours, pre-forming a sheet of synthetic plastic material by application of heat and pressure so that the same will conform to the contours of the base structure, superimposing the plastic cover structure on the base structure with a coating of bonding cement therebetween, and thereafter subjecting the base structure and cover structure to the action of heat and pressure to create a permanent bond therebetween.

Another object of my invention is the provision of novel apparatus for pre-forming a sheet of synthetic plastic material to the contour of a given base or supporting structure and independently of said structure, and for applying heat to a base structure and superimposed cover structure of pre-formed synthetic plastic material to cause said structures to be securely bonded together.

Still another object of my invention is the provision of a press having angularly disposed platens that are adapted to engage respective angularly disposed portions of the plastic sheet covered structure when the same is superimposed on the base or supporting structure, and of novel means for exerting pressure on said platens against the engaged portions of said cover structure, whereby uniform pressure is applied over substantially the entire surface of the cover structure against the supporting structure.

The above, and still further highly important objects and advantages of my invention will become apparent from the following detailed specification, appended claim and attached drawings.

Referring to the drawing wherein like reference characters indicate like parts throughout the several views:

FIG. 1 is a view in front elevation of a forming press utilized in carrying out one step of my novel method, some parts being broken away;

FIG. 2 is a view in end elevation as seen from the right to the left with respect to FIG. 1, on an enlarged scale, some parts being broken away;

FIG. 3 is an enlarged fragmentary section taken substantially on the line 3—3 of FIG. 1;

FIG. 4 is a view in front elevation of a bonding press of my invention, some parts being broken away;

FIG. 5 is an enlarged fragmentary view in end elevation as seen from the left to the right with respect to FIG. 4;

FIG. 6 is an enlarged fragmentary section taken substantially on the line 6—6 of FIG. 4; and FIG. 7, Sheet 3, is a still further enlarged fragmentary detail corresponding to a portion of FIG. 6.

In the producing of a counter top by my improved method, an elongated supporting structure, indicated in its entirety by the numeral 1, of the desired length and cross sectional shape, is built of wood or other suitable material to produce a normally horizontally disposed base 2, a vertically disposed back 3 adjacent the rear longitudinal edge of the base 2 and rigidly connected thereto by means of an elongated corner strip 4 that is rounded to provide an arcuate surface 5 tangent to the top surface of the base 2 and front surface of the back 3, and a reinforcing edge strip 6 rigidly secured to the front longitudinal edge of the base 2 and defining an upwardly projecting longitudinally extended rounded ridge 7 having a front surface 8 and a cross sectionally curved surface 9 that is tangent to the top surface of the base 1 and the front surface 8 of the strip 6. Preferably, the upper edge of the back 3 is rounded to provide a cross sectionally arcuate surface portion 10. With reference to FIGS. 6 and 7, it will be noted that the members 4 and 6 are connected to the base 2 and back 3 by conventional tongue and groove joints and which may be assumed to be glued together to provide a strong permanent structure.

A cover structure for the supporting structure 1, is indicated generally at 11, and is made from an elongated sheet of synthetic plastic material that is relatively rigid at normal room temperature, but which is rendered pliable when heated to a predetermined temperature substantially higher than normal room temperature. The plastic sheets used in making counter tops are usually of laminated structure, the bottom layer being adapted to be glued or otherwise adhered to the supporting structure, the top layer thereof providing a relatively hard working surface that is capable of withstanding considerable wear. Usually, the top layer is made with various colors or color patterns to give desired decorative qualities to the finished counter top. An example of the instant plastic sheet is manufactured and sold under the trademark "Formica." The cover structure 11 is formed under heat and pressure independently of the supporting structure 1, to a cross sectional shape which conforms to the contour of the surface portion of the supporting structure 1 to which the cover structure 11 is to be applied. When thus formed, the cover structure 11 comprises, a normally horizontally disposed portion 12 that is adapted to overlie the base 2, a vertically disposed portion 13 that is adapted to engage the front surface of the back 3, a rearwardly curved portion 14 adapted to engage the curved surface 10 of the back 3, an arcuate portion 15 connecting the back-engaging portion 13 and the horizontally disposed portion 12 and adapted to engage the arcuate surface 5 of the corner 4, a depending apron portion 16 adapted to engage the front surface 8 of the front strip 6, and a cross sectionally curved portion 17 tangent to the horizontally disposed portion 12 and apron portion 16 and adapted to engage the curved surface of the upwardly projecting ridge 7 of the front strip 6.

After the cover structure 11 has been formed, as above indicated, the supporting structure engaging surface thereof, or the cover structure engaging surface portions of the supporting structure 1, or both, are covered with a coating of suitable adhesive, and the cover structure 11 is superimposed on the supporting structure 1. Thereafter, heat and pressure is applied to the cover structure 11 against the supporting structure 1 to cause the same to be firmly bonded together, the applied heat being utilized to hasten the setting of the adhesive. After the bonding operation has been completed, any excess material of the cover structure 11, as indicated at 18 in FIG. 7, may be cut away flush with the rear surface of the back 3, after which the assembled structure is ready for installation.

For the purpose of forming the cover structure 11 to conform to the contours of the supporting structure 1, I provide a forming press as illustrated in FIGS. 1–3. The forming press comprises, an elongated generally rectangular lower frame 19 carried by leg structure 20, an elongated generally rectangular horizontally disposed lower pressure plate 21 mounted on the lower frame 19, an upper frame 22, and an elongated generally rectangular horizontally disposed upper pressure plate 23 mounted on the upper frame 22 in overlying parallel relationship to the lower pressure plate 21 and movable with said upper frame 22 toward and away from face to face engagement with the lower pressure plate 21. The opposite ends of the upper frame 22 are carried by the upper ends of a pair of vertically disposed piston plungers 24 mounted for vertical extending and retracting movements in respective fluid pressure cylinders 25 rigidly secured to and carried by hanger brackets 26 at opposite ends of the lower frame 19. The cylinders 25 are adapted to receive fluid under pressure from a suitable source, not shown, through conduit means 27 in which is interposed a directional control valve 28 by means of which fluid under pressure is introduced alternately to the top and bottom portion of the cylinders 25 to cause movement to be imparted to the upper frame 22 and pressure plate 23 toward and away from the lower pressure plate 21. The upper frame 22 and pressure plate 23 are normally gravity biased toward the lower pressure plate 21, and are further urged toward engagement of the pressure plate 23 with the pressure plate 21 by a pair of coil tension springs 29 anchored at their upper ends to longitudinally extending bars 30 on the upper frame 22, and at their lower ends to anchoring hooks 31 rigidly secured to the hanger brackets 26 of the lower frame 19.

Rigidly mounted on the lower frame 19 at the front longitudinal edge of the lower pressure plate 21, and extending longitudinally thereof, is an elongated tubular die element 32 a portion of the outer surface of which conforms substantially to the shape of the front strip 6 of the supporting structure 1. The die element 32 is preferably hollow and contains a conventional electric heating element 33 that is adapted to be connected to a source of electrical energy, not shown. As clearly shown in FIGS. 2 and 3, the die element 32 projects upwardly a short distance from the plane of the top surface of the lower pressure plate 21, the upper pressure plate 23 defining a raised shoulder portion 34 along its front longitudinal edge portion that is adapted to partially receive the die element 32 when the upper frame 22 and upper pressure plate 23 are moved to their operative material clamping positions indicated in full lines in FIG. 2 and shown in FIG. 3.

An elongated front forming plate 35 is pivotally secured to the front edge portions of the upper pressure plate 23 by means of a hinge 36, for swinging movements between a horizontally disposed inoperative position shown by dotted lines in FIG. 2 and a vertically disposed operative position shown by full lines in FIG. 2 and FIG. 3. As shown, the front forming plate 35 and shoulder 34 cooperate with the die element 32 to form the front longitudinal edge portion of a plastic sheet gripped between the pressure plates 21 and 23 to the contour of the ridge forming front strip 6 of the supporting structure 1. A second elongated tubular die element 37 extends longitudinally of and is rigidly secured to the rear edge of the upper pressure plate 23 and, like the die element 32, is heated electrically by means of a heating element 38, see FIG. 3. An elongated second forming plate 39 is pivotally secured to the rear edge of the lower pressure plate 21 by means of a hinge 40 for swinging movements between a generally horizontally disposed inoperative position indicated by dotted lines in FIG. 2, and an upwardly extended generally vertical operative position shown by full lines in FIGS. 2 and 3. The forming plate 39 cooperates with the second die element 37 to bend the rear longitudinal edge portion of the plastic sheet upwardly to provide the vertically disposed portion 13 of the cover structure 11 and the arcuate portion 15 thereof. At its free longitudinal edge, the second forming plate 39 is provided with a longitudinally extended tubular die element 41 similar to the die element 33 and containing an electric heating element 42. The die element 41 cooperates with an elongated rearwardly projecting plate like member 43 that is rigidly secured to an anchoring plate 44 which is detachably received in a plurality of notches 45 defined by a horizontally disposed plate like portion 46 of the upper frame 42, a plurality of retaining members 47, and upwardly extending frame members 48 of the upper frame 22, to bend the extreme rear longitudinal edge portion of the plastic sheet rearwardly to form the rearwardly curved portion of the cover structure 11. In the event that it is desired to provide a counter top having an upwardly extended rear portion of greater height than that shown in FIGS. 6 and 7, the plate like member 43 with its anchoring plate 44 are removed from the upper frame 22, as shown in FIG. 3, and a vertically disposed rear portion 13 of the cover structure 11 of any desired height, may be obtained.

For the purpose of applying heat and pressure to the cover structure 11 against the base structure 1, to rapidly and securely bond the same together after an adhesive coating has been applied to either or both thereof and the cover structure superimposed in nesting relation on the supporting structure 1, I provide a second or bonding press now to be described. Said bonding press, comprising relatively fixed and movable jaws 49 and 50, respectively, is illustrated in FIGS. 4–7, inclusive, the fixed jaw 49 including an elongated bed plate 51 mounted on a generally rectangular frame 52 that is supported by legs 53. A vertical abutment in the nature of an elongated channel member 54 extends longitudinally of the rear longitudinal edge of the bed plate 51, and is welded or otherwise rigidly secured to the frame 52, the vertically disposed front surface of the abutment forming channel member 54 being adapted to abut the rear surfaces of the back 3 and elongated corner 4 of the supporting structure 1 when the base 2 thereof is properly positioned on the bed plate 51.

The movable jaw 50 comprises a pair of laterally spaced parallel structural angle iron members 55 and 56 extending longitudinally of the front and rear longitudinal sides, respectively, of the frame 52, and a plurality of transversely extending vertical ribs 57 that are welded or otherwise rigidly secured to said angle members 55 and 56 at longitudinally spaced points thereon. The rear ends of the ribs 57 are each pivotally secured, by means of aligned pivot pins 58, to a different one of a plurality of of upstanding ears 59 that are welded or otherwise rigidly secured to the channel member 54 and frame 52, see FIGS. 5 and 6. The movable jaw 50 further includes a pair of laterally spaced parallel jaw plates 60 that extend longitudinally with respect to the frame 52, and that are welded or otherwise rigidly secured to each of the ribs 57 for common swinging movements therewith about the common axis of the pivot pins 58 toward and away from an operative position in upwardly spaced parallel relation to the bed plate 51. At their lower front end portions, the ribs 57 are provided with apertures 61 for the reception of latch hooks 62 that are pivotally mounted on the frame 52 for swinging movements into and out of latching engagement, each with a different one of said ribs 57. As shown in FIGS. 4–6, the latch hooks 62 are mounted on pivot pins 63 that are welded or otherwise secured in longitudinally spaced parallel relationship to an angle iron 64 of the frame 52. Each of the latch hooks 62 is yieldingly urged toward latching engagement with its respective rib 57 by means of coil tension springs 65 suitably anchored at their opposite ends to the latch hooks 62 and the angle iron 64. At latch release bar 66 extends longitudinally of the frame 52 below the angle iron 64, and is mounted for sliding movement longitudinally of the frame between vertically spaced guide members 67 and 68 rigidly secured to the frame 52.

The release bar 66 is provided with a plurality of latch hook engaging lugs 69, each engageable with a different one of said latch hooks 62 upon movement of the release bar 66 in one direction longitudinally of the machine and against yielding bias of the springs 65. A handle member 70 extends downwardly from one end portion of the release bar 66 within easy reach of an operator for imparting latch hook releasing movement to the release bar 66. For moving the movable jaw 50 between its operative position in relatively close proximity to the bed plate 51, as shown in full lines in FIGS. 4–6, and its inoperative position relatively remote therefrom, as indicated by dotted lines in FIG. 5, I provide a pair of fluid pressure operated cylinders 71 and cooperating piston plungers 72. The cylinders 71 are each pivotally secured at their lower ends to an opposite end of a longitudinally extending supporting bar 73, as indicated at 74, said supporting bar being welded or otherwise suitably secured to the frame structure 52. The outer free ends of the plungers 72 are each pivotally connected to mounting heads 75 that are secured to brackets 76 that extend longitudinally outwardly from the ribs 57 at opposite ends of the movable jaw 50, see FIGS. 4 and 5. Fluid under pressure is introduced selectively to opposite ends of the cylinder 71 to raise or lower the upper movable jaw 50 from a suitable source of fluid under pressure, not shown, through a conduit 77, a control valve 78, and a conduit 79 and 80 extending from the control valve 78 to the upper and lower ends, respectively, of both cylinders 71.

An elongated generally rectangular platen 81 is carried by the movable jaw 50 in underlying spaced parallel relation to the jaw plates 60, and comprises a flat main body plate 82, a flat mounting plate 83 overlying the body plate 82 and a facing plate 84 underlying the main body plate 82, said plates 82, 83 and 84 being secured together in face to face contact to form a laminated platen structure. The bottom surface of the main body plate 82 is formed to provide a plurality of laterally spaced parallel grooves 85 that extend longitudinally of the plate 82 and which contain conventional electric heating elements 86 which may be assumed to be connected to a source of electrical energy not shown. At its opposite ends, the mounting plate 83 is provided with a plurality of mounting studs 87 that extend upwardly through apertures 88 in the jaw plates 60. Coil compression springs 89 encompass each of the studs 87, being interposed between the jaw plates 60 and washers 90 that are mounted on the studs 87 adjacent the upper ends thereof. Adjustment nuts 91 are screw threaded on the upper end portions of the studs 87 and are utilized to vary the yielding bias exerted by the springs 89 in a direction to move the platen 81 toward the jaw plates 60. Inasmuch as the movable jaw 50 is of considerable weight, the springs 89 serve to cushion the impact between the platen 81 and the top surface of a counter top laced in the press when the jaw 50 is moved to its operative position, whereby to eliminate the danger of surface damage to the counter top by the platen 81. A pair of relatively flat elongated resilient tubes 92, preferably made from rubber impregnated fabric or the like, are interposed between the jaw plates 60 and the underlying platen 81, said tubes 92 extending longitudinally beyond the opposite ends of the movable jaw 50. When the jaw 50 is securely locked in place by the latch hooks 62, air under pressure is introduced to the interiors of the tubes 92 from a suitable source of pressure, not shown, through a conduit 93 in which is interposed a conventional control valve 94. The opposite ends of the tubes 92 are closed by suitable means such as clamping bars 95 and nut-equipped clamping screws 96, see FIG. 5. Air pressure within the tubes 92 assures an even pressure of the platen 81 over the entire area of the cover structure engaged thereby against the underlying base portion 2 of the supporting structure 1 of the counter top. It will be noted that, the front strip 6 of the counter top, extending below the plane of the bottom surface of the base 2, the front strip 6 rests upon the frame 52 forwardly of the front edge of the bed plate 51, see FIGS. 5 and 6. It will be further noted that the main body plate 82 extends forwardly beyond the front edge of the facing plate 84, so that the bottom surface of the forwardly projected portion of the main body plate 82 overlies and engages the curved portion 17 of the cover structure 11 overlying the upwardly projecting ridge 7 of the front strip 6. Thus, the engaged portion 17 is subject to heat and pressure to firmly bond the same to the front strip 6 at the upper surface portion thereof.

The front angle member 55 of the movable jaw 50 carries a vertically disposed longitudinal front platen 97 that is electrically heated in the same manner as the platen 81, and which is adapted to engage the apron portion 16 of the cover structure 11 when the jaw 50 is moved to its operative position. Interposed between the front platen 97 and the adjacent portion of the angle member 55 is an elongated closed ended resilient air tube 98 having a conduit connection 99 to the air conduit 93, see FIG. 5, whereby air under pressure is introduced to the interior of the tube 98 to cause the platen 97 to be pressed against the apron portion 16 uniformly along its entire length. A second vertically disposed longitudinally extending platen 100 is carried by the rear angle member 56 and is adapted to operatively engage the vertically disposed portion 13 of the cover structure 11 to firmly press the same against the back 3 of the supporting structure 2. An elongated pressure tube 101, similar to the tubes 92 and 98, is interposed between the vertical platen 100 and the adjacent portion of the angle member 56, and is adapted to receive air under pressure from the conduit 93 through a branch conduit 102, see FIG. 5, whereby bonding pressure is exerted on the platen 100 against the vertically disposed back portion of the counter top. The rearwardly curved portion 14 of the cover structure 11 is pressed downwardly against the upper edge of the back 3 by a narrow elongated horizontally disposed platen element 103 which, like the other platen elements, is heated by suitable electric heating elements, and which is pressed against the underlying top edge of the back 3 and overlying portion of the cover structure 11 by air under pressure within an elongated resilient pressure tube 104 that is interposed between the platen element 103 and the overlying portion of the rear angle member 56. The pressure tube 104 is similar to the aforementioned pressure tubes 60, 98 and 101, and receives air under pressure from the conduit 93 to a branch conduit 105, see FIG. 5.

In order that a firm bond be obtained between arcuate portion 15 of the cover structure 11 and the corresponding arcuate surface 5 of the elongated corner 4, I provide an elongated, cross sectionally arcuate, pressure member 106 that is disposed between the bottom edge of the vertically disposed platen 100 and the rear edge of the platen 81. With reference to FIG. 7, it will be noted that the pressure member 106 is tubular in form, being provided with a longitudinal slot 107 which slidably receives an elongated angular web 108 that extends longitudinally of the rear angle member 56, and which is welded or otherwise rigidly secured to the bottom edge 109 thereof. An elongated elastic 110, preferably made from soft rubber or the like, is interposed between the bottom edge of the web 108 and the opposing inner wall surface of the pressure member 106, and exerts yielding bias against the tubular pressure member 106 to press the same against the arcuate portion 15 of the cover structure 11 to firmly hold said arcuate portion 15 against the arcuate surface 5 when the jaw 50 is in its operative position.

From the above, it should be obvious that heat from the several platens will not only cause the pre-formed cover structure 11 to mold itself to the exact contours of the supporting structure 1, but will also hasten the setting or curing of the adhesive between the cover structure 11 and the supporting structure 1. The various pressure tubes together with the elastic member 110 insure application of bonding pressure over substantially the entire area of the counter top, and compensate for variations in dimensional tolerances in the various parts of the machine. With the above arrangement, it is only necessary that the portions of the stationary and movable jaws which engage cooperating surfaces of the counter top be of substantially the same degree of flatness as the flat portions of the counter top structure.

While I have shown and described a commercial embodiment of the apparatus of my invention and a method of carrying out the same, it will be understood that the same is capable of modification without departure from the spirit and scope of the invention as defined in the claim.

What I claim is:

In an apparatus for producing counter tops from base structures and sheets of synthetic plastic material, means for forming a sheet of said plastic material to conform to the contours of a given base structure and independently of said base structure, and a press comprising fixed and movable jaws, means for moving said movable jaw between an inoperative position relatively remote from said stationary jaw and an operative position in relatively close proximity to said stationary jaw, a bedplate mounted on said stationary jaw for supporting said base structure, said movable jaw including jaw plate means disposed in spaced generally parallel relation to said bed-plate when said movable jaw is in its operative position, a platen, means mounting said platen on said jaw plate means for common movements with said movable jaw and for independent movements toward and away from said jaw plate means, yielding means urging said platen toward said jaw plate means, means for heating said platen, and a pair of laterally spaced elongated inflatable tubes interposed between said platen and said jaw plate means, said tubes being substantially co-extensive with the length of said platen and adapted to be connected to a source of fluid under pressure whereby said platen is moved away from said jaw plate means and toward said bed-plate against bias of said yielding means, said platen engaging a formed sheet of plastic material superimposed on said base structure, when said sheet and base structure are gripped between said jaws in the operative positions of said jaws, to apply heat and bonding pressure to said sheet and base structure.

References Cited in the file of this patent

UNITED STATES PATENTS

| | | |
|---|---|---|
| 2,530,667 | Smith | Nov. 21, 1950 |
| 2,537,918 | Skoog | Jan. 9, 1951 |
| 2,556,060 | Brinker | June 5, 1951 |
| 2,648,370 | Beach | Aug. 11, 1953 |
| 2,739,636 | Tyler | Mar. 27, 1956 |
| 2,739,637 | Tyler | Mar. 27, 1956 |
| 2,739,640 | Brinker et al. | Mar. 27, 1956 |
| 2,744,850 | Schofield | May 8, 1956 |
| 2,797,179 | Reynolds et al. | June 25, 1957 |
| 2,804,909 | Hammer | Sept. 3, 1957 |